(12) United States Patent
Ogata et al.

(10) Patent No.: US 11,679,756 B2
(45) Date of Patent: Jun. 20, 2023

(54) CONTROL METHOD AND CONTROL DEVICE FOR INTERNAL COMBUSTION ENGINE

(71) Applicant: NISSAN MOTOR CO., LTD., Yokohama (JP)

(72) Inventors: Makoto Ogata, Kanagawa (JP); Masayuki Ootani, Kanagawa (JP); Yoshihiro Terai, Kanagawa (JP); Tsukasa Ichiba, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/630,648

(22) PCT Filed: Nov. 8, 2019

(86) PCT No.: PCT/JP2019/043959
§ 371 (c)(1),
(2) Date: Jan. 27, 2022

(87) PCT Pub. No.: WO2021/090493
PCT Pub. Date: May 14, 2021

(65) Prior Publication Data
US 2022/0258721 A1    Aug. 18, 2022

(51) Int. Cl.
*B60W 20/17* (2016.01)
*F02D 29/06* (2006.01)
*F16D 3/12* (2006.01)

(52) U.S. Cl.
CPC ............ *B60W 20/17* (2016.01); *F02D 29/06* (2013.01); *F16D 3/12* (2013.01)

(58) Field of Classification Search
CPC ........... B60W 20/17; F02D 29/06; F16D 3/12
See application file for complete search history.

(56) References Cited

U.S. PATENT DOCUMENTS

| | | | |
|---|---|---|---|
| 2017/0072936 A1* | 3/2017 | Inagawa ................ | B60W 20/11 |
| 2020/0094842 A1* | 3/2020 | Chang ................... | B60W 20/15 |
| 2022/0145820 A1* | 5/2022 | Hotta .................... | F02D 41/009 |
| 2023/0058410 A1* | 2/2023 | Witt ...................... | B60W 10/02 |

FOREIGN PATENT DOCUMENTS

JP    2009-281189 A    12/2009

* cited by examiner

*Primary Examiner* — George C Jin
(74) *Attorney, Agent, or Firm* — Foley & Lardner LLP

(57) ABSTRACT

Disclosed is a control method for an internal combustion engine (3) including a power generation motor (4) driven by a power of the internal combustion engine (3) and a damper (30) provided between the internal combustion engine (3) and the power generation motor (4) in a power transmission path, wherein a maximum value of a torque fluctuation generated in an event of a misfire occurring in a cylinder of the internal combustion engine (3) is larger than a value at which a displacement of a main damper (30a) of the damper (30) is allowed to be suppressed to be smaller than a displacement at which abutting occurs on a first stopper (31a) by a counter torque of the power generation motor (4), and the control method includes limiting a torque (Te) of the internal combustion engine (3) within a range in which a displacement of the main damper (30a) is allowed to be controlled to be smaller than a displacement at which abutting occurs on the first stopper (31a) by a counter torque of the power generation motor (4).

5 Claims, 3 Drawing Sheets

CONTROL METHOD AND CONTROL DEVICE FOR INTERNAL COMBUSTION ENGINE

TECHNICAL FIELD

The present invention relates to an internal combustion engine control.

BACKGROUND ART

JP2009-281189A discloses a technique of limiting transmission of an excessive torque in the event of an engine misfire or the like by using a damper installed with a torque limiter.

SUMMARY OF INVENTION

In JP2009-281189A, it is necessary to adopt a damper installed with a torque limiter as a damper in order to limit transmission of an excessive torque.

In view of such a problem, it is therefore an object of the present invention to limit transmission of an excessive torque without adopting the torque limiter and reduce a load applied to a stopper of the damper.

A control method for an internal combustion engine according to a certain aspect of the present invention is a control method for the internal combustion engine which includes an electric generator driven by a power of the internal combustion engine, and a damper provided between the internal combustion engine and the electric generator in a power transmission path. In the control method, a maximum value of a torque fluctuation generated in an event of a misfire occurring in a cylinder of the internal combustion engine is larger than a value at which a displacement of the damper is allowed to be suppressed to be smaller than a displacement at which abutting occurs on a stopper of the damper by a counter torque of the electric generator. The control method includes limiting a torque of the internal combustion engine within a range in which a displacement of the damper is allowed to be controlled to be smaller than a displacement at which abutting occurs on the stopper by a counter torque of the electric generator.

According to another aspect of the present invention, a control device for an internal combustion engine corresponding to the control method for the internal combustion engine mentioned above is provided.

DESCRIPTION OF EMBODIMENTS

Embodiments of the present invention will now be described with reference to the accompanying drawings.

Figure 1:
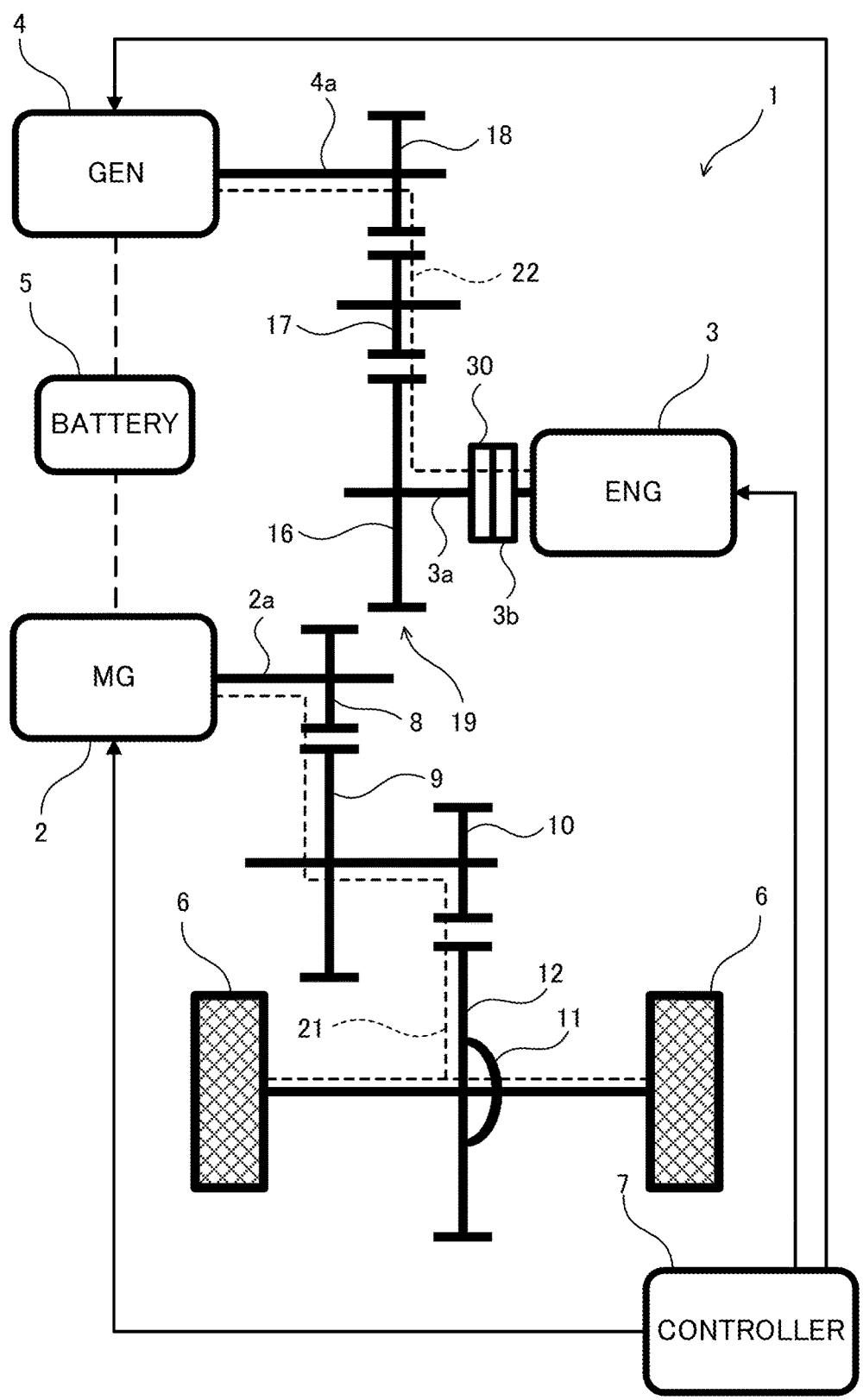
FIG. 1 is a schematic configuration diagram illustrating main parts of a vehicle.

FIG. 1 is a schematic configuration diagram illustrating main parts of the vehicle 1. The vehicle 1 has an internal combustion engine 3, a power generation motor 4, a battery 5, a driving motor 2, and a controller 7.

The internal combustion engine 3 may be either a gasoline engine or a diesel engine. A flywheel 3b is provided on an output shaft 3a of the internal combustion engine 3. The flywheel 3b serves as a rotating member provided between the internal combustion engine 3 and the damper 30 described below in a power transmission path.

The power generation motor 4 is driven by the power of the internal combustion engine 3 to generate electricity. The power generation motor 4 constitutes an electric generator.

The battery 5 is charged with the electric power generated by the power generation motor 4 and the electric power regenerated by the driving motor 2 as described below.

The driving motor 2 is driven by the electric power of the battery 5 to drive the driving wheels 6. In addition, the driving motor 2 also has a so-called regeneration function in which deceleration energy is regenerated as electric power as it rotates along with rotation of the driving wheels 6 during deceleration or the like.

The controller 7 controls the driving motor 2, the internal combustion engine 3, and the power generation motor 4. The controller 7 includes a microcomputer provided with a central processing unit (CPU), a read-only memory (ROM), a random access memory (RAM), and an input/output interface (I/O interface). It is also possible to configure the controller 7 with a plurality of microcomputers. The controller 7 receives signals input from various sensors or switches such as a rotation speed sensor for detecting a rotation speed Ne of the internal combustion engine 3, an accelerator position sensor for detecting an accelerator position APO, and a vehicle speed sensor for detecting a vehicle speed VSP.

The vehicle 1 has a first power transmission path 21 and a second power transmission path 22. The first power transmission path 21 transmits power between the driving motor 2 and the driving wheels 6. The second power transmission path 22 transmits power between the internal combustion engine 3 and the power generation motor 4. The first power transmission path 21 and the second power transmission path 22 are power transmission paths that are independent of each other, that is, power is not transmitted from one of the first power transmission path 21 and the second power transmission path 22 to the other.

The first power transmission path 21 includes a first reduction gear 8 provided on the rotation shaft 2a of the driving motor 2, a second reduction gear 9 that meshes with the first reduction gear 8, a third reduction gear 10 that is provided coaxially with the second reduction gear 9 and meshes with a differential gear 12, and a differential gear 12 provided on a differential casing 11.

The second power transmission path 22 includes a fourth reduction gear 16 provided on an output shaft 3a of the internal combustion engine 3, a fifth reduction gear 17 that meshes with the fourth reduction gear 16, and a sixth reduction gear 18 that is provided on the rotation shaft 4a of the power generation motor 4 and meshes with the fifth reduction gear 17. The fourth reduction gear 16, the fifth reduction gear 17, and the sixth reduction gear 18 constitute a gear train 19 provided between the internal combustion engine 3 and the power generation motor 4.

A damper 30 is provided in the second power transmission path 22. The damper 30 is provided on the output shaft 3a of the internal combustion engine 3 and attenuates a torsional vibration of the output shaft 3a.

Each of the first power transmission path 21 and the second power transmission path 22 does not have an element for blocking power transmission. That is, each of the first power transmission path 21 and the second power transmission path 22 has a state where power is transmittable at all times.

The vehicle 1 having the aforementioned configuration is a series hybrid vehicle in which the driving motor 2 drives the driving wheels 6 by utilizing the electric power of the power generation motor 4 driven by the power of the internal combustion engine 3 to generate electricity.

Figure 2:
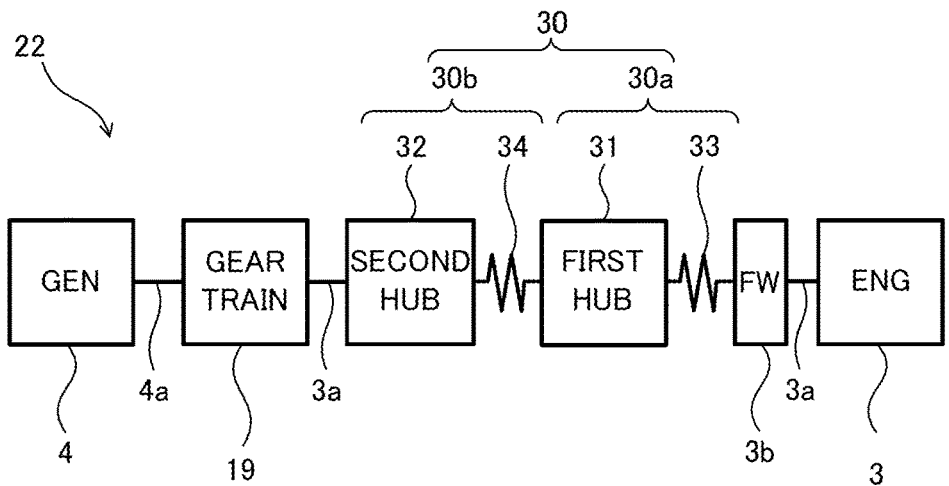
FIG. 2 is a diagram schematically illustrating a power transmission system of a second power transmission path.

FIG. 2 is a diagram schematically illustrating a power transmission system of the second power transmission path 22 including the damper 30. In the second power transmission path 22, the power of the internal combustion engine 3 is transmitted from the internal combustion engine 3, to the output shaft 3a, to the flywheel 3b, to the damper 30, to the output shaft 3a, to the gear train 19, to the rotation shaft 4a of the power generation motor 4, and to the power generation motor 4 in this order.

The damper 30 includes a main damper 30a and a pre-damper 30b. The main damper 30a has a function of attenuating the torsional vibration with respect to the torque Te of the internal combustion engine 3 transmitted from the flywheel 3b. The pre-damper 30b has a function of attenuating the torsional vibration with respect to the torque Te transmitted from a first hub 31.

The main damper 30a includes a first hub 31 and a main coil 33. The first hub 31 is provided rotatable by the main coil 33 within a predetermined angle range relative to the flywheel 3b. A plurality of main coils 33 are provided in the circumferential direction of the damper 30.

The pre-damper 30b includes a second hub 32 and a pre-coil 34. The second hub 32 is provided rotatable by the pre-coil 34 within a predetermined angle range relative to the first hub 31. A plurality of pre-coils 34 are provided in the circumferential direction of the damper 30.

A plurality of pre-coils 34 are set to have a smaller spring force than that of a plurality of main coils 33 depending on a compression displacement per unit length, and, for example, a coil having a lower spring constant than that of the main coil 33 is used as the pre-coil 34. Therefore, when the power of the internal combustion engine 3 is input to the damper 30, the pre-damper 30b first starts to attenuate the torsional vibration before the main damper 30a, and a relative rotation occurs between the first hub 31 and the second hub 32.

Figure 3A:
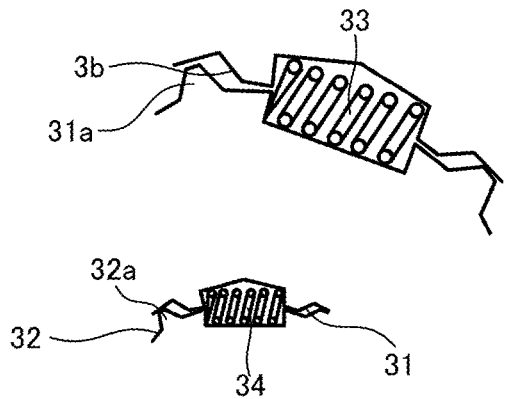
FIG. 3A is a diagram illustrating a first state of the damper.
Figure 3B:
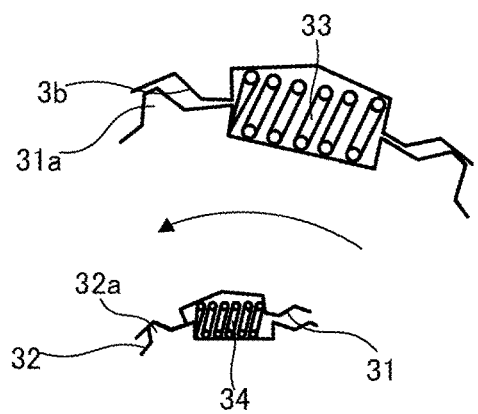
FIG. 3B is a diagram illustrating a second state of the damper.

FIG. 3A is a diagram illustrating a first state of the damper 30. FIG. 3B is a diagram illustrating a second state of the damper 30. FIGS. 3A and 3B show main parts of the damper 30 as seen along the axial direction of the output shaft 3a.

When the power of the internal combustion engine 3 is not input to the damper 30, both the main damper 30a and the pre-damper 30b are in the first state shown in FIG. 3A. Then, when the power of the internal combustion engine 3 is input to the damper 30 from this state, compression occurs in the pre-coil 34 on the side where the spring constant is low, so that the first hub 31 starts to rotate relative to the second hub 32. That is, out of the main damper 30a and the pre-damper 30b, the pre-damper 30b first starts to attenuate the torsional vibration. Then, when the first hub 31 further rotates, as shown in FIG. 3B, the first hub 31 abuts on the second stopper 32a provided on the second hub 32. The second stopper 32a regulates a relative rotation of the first hub 31 with respect to the second hub 32.

When the second hub 32 rotates along with the first hub 31 from the second state shown in FIG. 3B, the power of the internal combustion engine 3 is transmitted to the gear train 19. At this time, when the main coil 33 is compressed in the main damper 30a, a relative rotation occurs between the first hub 31 and the flywheel 3b, so that the main damper 30a functions. The function of the main damper 30a is secured as long as the main coil 33 is not compressed to the state where abutting occurs on the first stopper 31a. The first stopper 31a regulates a relative rotation of the flywheel 3b with respect to the first hub 31. The flywheel 3b abuts on the first stopper 31a when there is an excessive input. The power of the internal combustion engine 3 may be transmitted from the flywheel 3b to the main damper 30a, for example, via a disk-shaped plate. The damper 30 may further have such a plate, and in this case, the plate may form a rotating member that abuts on the first stopper 30a.

Meanwhile, in the second power transmission path 22, a resonance point is set to be lower than an idle rotation speed range of the internal combustion engine 3. However, when a misfire occurs in the internal combustion engine 3, the resonance point enters a normal operation range of the internal combustion engine 3 due to a decrease in the number of the ignited cylinders.

Therefore, when a misfire occurs in the internal combustion engine 3 during a full load operation, that is, during a power generation operation of the internal combustion engine 3 in a WOT (Wide Open Throttle) state, the load caused by the excessive input may be applied to the first stopper 31a as resonance and divergence occur depending on the rotation speed Ne of the internal combustion engine 3.

In this regard, for example, the damper 30 may be set as a damper installed with a torque limiter. However, in this case, it would be disadvantageous in terms of cost.

In addition, for example, it is conceivable that abutting of the first stopper 31a may be prevented by suppressing the displacement of the main damper 30a to be smaller than a displacement at which abutting occurs on the first stopper 31a by a counter torque of the power generation motor 4.

However, the maximum value of the fluctuation of the torque Te of the internal combustion engine 3 at which a misfire occurs in a cylinder is larger than a value at which a displacement of the main damper 30a can be suppressed to be smaller than a displacement at which abutting occurs on the first stopper 31a by the counter torque of the power generation motor 4. Therefore, in this case, it is difficult to prevent abutting of the first stopper 31a.

In addition, for example, it is conceivable to prevent resonance by increasing the torque hysteresis of the damper 30 depending on the twist angle θ. However, in this case, due to influence on the rotation suppression function by the pre-damper 30b during an idle operation, a rattling noise may be generated in a low torque range of the internal combustion engine 3, and the damper function may be degraded.

In view of such circumstances, according to the present embodiment, the controller 7 limits the torque Te of the internal combustion engine 3 within a range in which a displacement of the main damper 30a can be controlled to be smaller than a displacement at which abutting occurs on the first stopper 31a by the counter torque of the power generation motor 4.

Figure 4A:
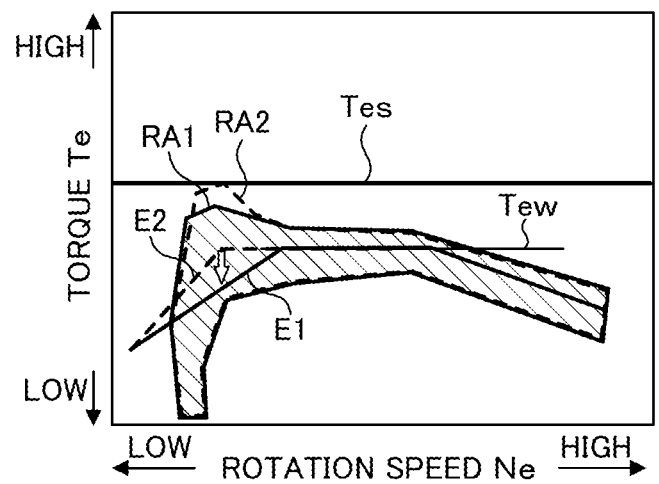
FIG. 4A is a diagram illustrating an operation region of an internal combustion engine including torque fluctuations.
Figure 4B:
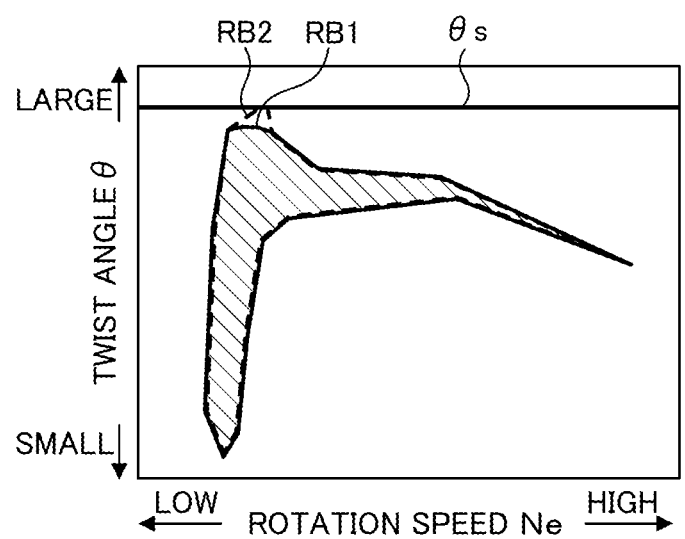
FIG. 4B is a diagram illustrating a twist angle of a main damper depending on a rotation speed.

FIG. 4A is a diagram illustrating an operation region of the internal combustion engine 3 including a fluctuation of the torque Te. FIG. 4B is a diagram illustrating a twist angle θ of the main damper 30a depending on the rotation speed Ne. In FIGS. 4A and 4B, a case of the comparative example is also illustrated by the broken lines. A comparative example shows a case where the controller 7 does not limit the torque Te of the internal combustion engine 3.

In the case of the comparative example, as shown in FIG. 4A, the internal combustion engine 3 is operated on the basis of a preset engine performance line E2. As a result, the operation region of the internal combustion engine 3 becomes the region RA2 having an extension above and below the engine performance line E2 due to a fluctuation of the torque Te. Furthermore, as shown in FIG. 4B, the twist angle θ fluctuates within the region RB2 depending on the region RA2.

In the case of the comparative example, when the internal combustion engine 3 is operated to generate power in the WOT state, it becomes difficult to control the torque Te within a range in which a displacement of the main damper 30a can be controlled to be smaller than a displacement at which abutting occurs on the first stopper 31a by the counter torque of the power generation motor 4. As a result, as shown in FIG. 4A, the torque Te reaches the stopper torque Tes at which abutting occurs on the first stopper 31a. In addition, as shown in FIG. 4B, the twist angle θ reaches a contact angle θs for the first stopper 31a. The torque Te reaches the stopper torque Tes at the WOT torque Tew set on the engine performance line E2.

In the case of this embodiment, the torque Te of the internal combustion engine 3 is limited as described above. The torque Te is limited as described above by operating the internal combustion engine 3 on the basis of the engine performance line E1 obtained by reducing the WOT torque Tew on the engine performance line E2 to a torque lower than the WOT torque Tew on the side where the rotation speed Ne is low. In other words, such an engine performance line E1 is an engine performance line in which the rotation speed Ne reaching the WOT torque Tew is set to a higher rotation speed Ne side as compared with the engine performance line E2.

By operating the internal combustion engine 3 on the basis of the engine performance line E1, the torque Te is limited during the engine operation at all times. Therefore, the torque Te is limited depending on the operation of the internal combustion engine 3. As a result, according to the present embodiment, as shown in FIG. 4A, the operation region of the internal combustion engine 3 becomes a region RA1 that does not reach the stopper torque Tes. In addition, as shown in FIG. 4B, the twist angle θ fluctuates within the region RB1 corresponding to the region RA1, and does not reach the contact angle θs.

The engine performance line E1 may be set in advance on the basis of the rotation speed Ne and the torque Te, for example, by using map data. The controller 7 configured to limit the torque Te as described above is configured to have a control unit.

Next, main effects of the present embodiment will be described.

According to the present embodiment, in a control method for an internal combustion engine 3 including a power generation motor 4 driven by a power of the internal combustion engine 3 and a damper 30 provided between the internal combustion engine 3 and the power generation motor 4 in the power transmission path, a maximum value of a torque fluctuation generated in the event of a misfire occurring in a cylinder of the internal combustion engine 3 is larger than a value at which a displacement of the main damper 30a of the damper 30 is allowed to be suppressed to be smaller than a displacement at which abutting occurs on the first stopper 31a by a counter torque of the power generation motor 4. In addition, the control method of the internal combustion engine 3 includes limiting the torque Te of the internal combustion engine 3 within a range in which a displacement of the main damper 30a can be controlled to be smaller than a displacement at which abutting occurs on the first stopper 31a by the counter torque of the power generation motor 4.

In this method, since the internal combustion engine 3 is operated within a range in which abutting does not occur on the first stopper 31a, it is possible to limit the transmission of an excessive torque without adopting a damper installed with a torque limiter. Therefore, in this method, it is possible to reduce the load applied to the first stopper 31a.

When the torque Te is limited after determining the misfire, a load may be applied to the first stopper 31a between the occurrence of the misfire and the start of the torque Te limitation.

According to the present embodiment, the torque Te of the internal combustion engine 3 is limited depending on an operation of the internal combustion engine 3. Therefore, it is possible to avoid the occurrence of the load on the first stopper 31a by limiting the torque Te at all time.

According to the present embodiment, the damper 30 includes the main damper 30a and the pre-damper 30b. The first stopper 31a is provided in the first hub 31. The flywheel 3b provided between the internal combustion engine 3 and the damper 30 in the power transmission path abuts on the first stopper 31a.

In the method according to the present embodiment, by configuring the damper 30 in this manner, it is possible to avoid an increase of the torque hysteresis of the damper 30 in order to prevent resonance. As a result, it is possible to avoid degradation of the damper function that may occur when the rotation suppression function of the pre-damper 30b during an idle operation is affected by increasing the torque hysteresis.

According to the present embodiment, the internal combustion engine 3 is mounted on a vehicle 1 which serves as a series hybrid vehicle. The vehicle 1 includes the driving motor 2 that drives the driving wheels 6 by the electric power generated by the power generation motor 4, the first power transmission path 21 for transmitting power between the driving motor 2 and the driving wheels 6, and the second power transmission path 22 for transmitting power between the internal combustion engine 3 and the power generation motor 4. In the vehicle 1, the damper 30 is provided in the second power transmission path 22.

In the method according to the present embodiment, when the internal combustion engine 3 is mounted on such a series hybrid vehicle, it is possible to reduce the load applied to the first stopper 31a due to occurrence of resonance and divergence caused by a misfire of the internal combustion engine 3.

While the embodiments of the present invention have been described hereinbefore, the aforementioned embodiments are merely a part of the application examples of the present invention, and are not intended to limit the technical scope of the present invention to the specific configurations of the aforementioned embodiments.

In the aforementioned embodiments, a case where the damper 30 includes the main damper 30a and the pre-damper 30b has been described. However, it may also be possible to use a damper that does not have a pre-damper 30b as the damper 30. Even in this case, it is possible to reduce the load on the first stopper 31a by operating the internal combustion engine 3 within a range in which abutting does not occur on the first stopper 31a.

In the aforementioned embodiments, a case where the control method and the control unit of the internal combustion engine 3 are realized by a single controller 7 has been described. However, the control method and control unit of the internal combustion engine 3 may also be realized by, for example, a combination of a plurality of controllers.

The invention claimed is:

1. A control method for an internal combustion engine, wherein the internal combustion engine includes:

an electric generator driven by a power of the internal combustion engine; and a damper provided between the internal combustion engine and the electric generator in a power transmission path, a maximum value of a torque fluctuation generated in an event of a misfire occurring in a cylinder of the internal combustion engine is larger than a value at which a displacement of the damper is allowed to be suppressed to be smaller than a displacement at which abutting occurs on a stopper of the damper by a counter torque of the electric generator, and the control method comprises limiting a torque of the internal combustion engine within a range in which a displacement of the damper is allowed to be controlled to be smaller than a displacement at which abutting occurs on the stopper by a counter torque of the electric generator.

2. The control method according to claim 1, comprising limiting the torque of the internal combustion engine depending on an operation of the internal combustion engine.

3. The control method according to claim 1, wherein the damper includes a main damper and a pre-damper, the stopper is provided in a hub of the main damper, and a rotating member provided between the internal combustion engine and the damper in the power transmission path abuts on the stopper.

4. The control method according to claim 1, wherein the internal combustion engine is mounted on a series hybrid vehicle which includes;

a driving motor that drives driving wheels by power generated by the electric generator;

a first power transmission path that transmits a power between the driving motor and the driving wheels; and a second power transmission path that transmits a power between the internal combustion engine and the electric generator, and in the series hybrid vehicle, the damper is provided in the second power transmission path.

5. A control device for an internal combustion engine, wherein the internal combustion engine includes:

an electric generator driven by a power of the internal combustion engine; and a damper provided between the internal combustion engine and the electric generator in a power transmission path, a maximum value of a torque fluctuation generated in an event of a misfire occurring in a cylinder of the internal combustion engine is larger than a value at which a displacement of the damper is allowed to be suppressed to be smaller than a displacement at which abutting occurs on a stopper of the damper by a counter torque of the electric generator, and the control device comprises a controller that limits a torque of the internal combustion engine within a range in which a displacement of the damper is allowed to be controlled to be smaller than a displacement at which abutting occurs on the stopper by a counter torque of the electric generator.

* * * * *